Patented Sept. 12, 1944

2,357,839

UNITED STATES PATENT OFFICE 2,357,839

PLASTIC COMPOSITION

Ralph H. Manley and Cyril D. Evans, Peoria, Ill., assignors to Claude R. Wickard, as Secretary of Agriculture of the United States of America, and his successors in office No Drawing. Application January 5, 1943, Serial No. 471,360

11 Claims. (Cl. 106—149)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to plastic compositions, more particularly to plastic compositions containing prolamines, and has for one of its objects the provision of improved prolamine films and plastics.

Prolamines, the proteins of cereal grains, such as gliadin of wheat, hordein of barley and zein of corn, are soluble in a number of solvents and may be utilized as base materials for synthetic resins, coating compositions and other similar products.

The utility of these manufactures, however, is limited by their low resiliency and lack of resistance to water. Prolamine-containing plastics, coatings, films, filaments and the like are very brittle and on exposure to aqueous media undergo deformation and are discolored.

It has been proposed to overcome these undesirable characteristics by addition of plasticizers or softening agents, such as glycerol, polyethylene glycols, dibutyl tartrate and ortho- or para-toluene monoethyl sulfonamides. However, the results obtained are not satisfactory because some of these substances are not fully compatible with prolamines and exercise only a limited plasticizing effect, and none of the prolamine plasticizers used heretofore improve sufficiently the water-resistance of the plasticized material.

We have found that polymeric fat acids are excellent plasticizers for prolamines, and that additions of polymeric fat acids not only improve the mechanical properties of prolamine compositions but also render them resistant to the action of water.

Polymeric fat acids are high molecular weight polymeric compounds formed by thermal polymerization of compounds containing acyl radicals of unsaturated fat acids.

Fat acids are aliphatic carboxylic acids which occur, usually, in the form of their esters, such as the glyceryl esters, in natural and processed fatty and oily materials of vegetable and animal origin.

Fat acids, the acyl radical of which contains at least one carbon to carbon double bond, are capable of undergoing polymerization, for instance, as a result of thermal or thermal catalytic treatments, and this property is common to a number of compounds containing acyl radicals of polymerizable fat acids. The polymerization is an intermolecular condensation which proceeds through the unsaturation of the acyl radicals of the polymerizable fat acids, the reaction product consisting chiefly of monomeric unpolymerized compounds and dimeric and trimeric compounds, formed respectively by union of two or three molecules.

While polymeric fat acids are good plasticizers for prolamines, the monomeric polymerizable fat acids, such as linolenic or linoleic acids, are not sufficiently compatible with the proteins, and tend to oxidize on contact with air forming hard, brittle, resinous products and are therefore not suitable for use as plasticizers.

Polymeric fat acids are obtainable from polymerization products formed by subjecting substances containing polymerizable fat acids or their derivatives, such as glycerides or other esters, to polymerization with subsequent elimination of the non-polymerized or monomeric fraction of the treated materials. For instance, polymeric fat acids may be obtained from fatty oils containing glycerides of polymerizable fat acids, such as oils of the drying and semi-drying type like oils of peanut, cottonseed, wheat, soybean, corn or linseed, perilla oil, tung oil or dehydrated castor oil. These oils are polymerized in the usual manner by thermal treatment in the presence or in the absence of suitable polymerization catalysts. The polymeric glycerides are saponified and the polymeric fat acids separated from the non-polymeric fat acids by distillation or solvent extraction.

Another procedure suitable for the production of polymeric fat acids consists in subjecting the fatty oils to alcoholysis with monohydric alcohols, such as methanol or ethanol, thereby converting the glycerides of the fat acids to the corresponding monohydric esters. These esters are then polymerized, yielding monohydric esters of polymeric fat acids which can be segregated from the reaction products by distillation and converted to polymeric fat acids by hydrolysis.

Still another method for preparing polymeric fat acids consists in producing the free fat acids by hydrolysis of the fatty material and then polymerizing the free fat acids.

Polymeric fat acids may also be obtained from the unsaturated fat acid constituents of tall oil, and from non-drying oils or their constituents, such as oleic acid, by polymerization in the presence of suitable catalysts such as, for example, boron trifluoride.

The polymeric fat acids obtained by any of the foregoing procedures consist primarily of dibasic dimeric fat acids, admixed with tribasic trimeric fat acids and higher polymers. It is desirable that the polymeric fat acids used to plasticize prolamines be as nearly pure dimeric fat acid as possible. The dibasic dimeric fat acids may be obtained substantially free of admixtures by distillation under reduced pressure. The usefulness of such polymeric fat acids as prolamine plasticizers may be substantially improved by either partial or complete hydrogenation of the unsaturated carbon-carbon double bonds which may be present in such material.

Polymeric fat acids are compatible with prolamines in all proportions, the amount of the plasticizing agent to be added depending on the properties desired in the final product. Prolamine compositions containing relatively small amounts of polymeric fat acids form tough resilient products, while large amounts of polymeric fat acids convert prolamines to soft, plastic materials which may be vulcanized, for example, by a treatment with sulfur chloride vapors to yield rubber-like products.

The water resistance of prolamines is improved by plasticization with polymeric fat acids. It may be further improved by heating the prolamines in dispersed form in the presence of aldehydes at elevated temperatures, followed by heating of the films, filaments, or plastics produced from such aldehyde treated protein to 120° or higher for a short time. The products so obtained are impervious to mustard gas (dichlorodiethyl sulfide). Suitable aldehydes are aliphatic, aromatic or heterocyclic aldehydes such as, for example, formaldehyde, acetaldehyde, propionaldehyde, crotonaldehyde, acrolein, benzaldehyde, or substances yielding aldehydes either through molecular rearrangement or by decomposition such as, for example, hexamethylene tetramine, paraformaldehyde and the like.

Similar results are obtained by using as starting materials aldehyde modified prolamines obtained according to processes disclosed in our copending applications, Serial Nos. 429,576 and 429,577, filed February 4, 1942, and plasticizing such proteins with polymeric fat acids and then heating the films, fibers or plastics obtained from such protein dispersions to 120° C. or higher.

According to the disclosure in our application, Serial No. 429,576, prolamine dispersions may be effectively stabilized against gelation by heating them to elevated temperatures, preferably, in the presence of an aldehyde. Suitably, the prolamine dispersions are heated in a closed container in the presence of an aldehyde for about 15 minutes at a temperature of about 120° C.

In application Serial No. 429,577, we have shown that the danger of gelation during extraction and subsequent processing may be eliminated by extracting prolamines with prolamine dispersing media in the presence of an aldehyde, and that a prolamine dispersion may be obtained in this manner which does not gel on prolonged storage. Satisfactory results both in respect to the yield of extracted prolamine and in resistance of the extracted material to gelation are obtained by conducting the extraction in a closed container at a temperature of about 120° C. for a period of about 15 minutes.

Any organic solvent for prolamines may be used as a dispersing medium in the processes just described. Good results are obtained with aliphatic alcohols, such as methyl, ethyl and the propyl alcohols, and with aliphatic ketones, such as acetone.

Likewise, a wide variety of aldehydes may be used in carrying out the processes. It is desirable, of course, that the aldehyde used be miscible with other components of the solvent mixture, but with this limitation aldehydes in general may be used. For instance, any of the aldehydes previously mentioned in connection with the invention disclosed in the present application may be suitably used.

The processes disclosed in our copening applications for patent are illustrated by the following examples:

*Example 1.*—20 g. of dry zein was dissolved in a mixture of 95 cc. of aqueous 80 percent ethyl alcohol (by weight) and 5 cc. of commercial 37 percent formaldehyde solution. This mixture was then placed in a sealed container and heated for 15 minutes at 120° C. After cooling and removing from the sealed container, the treated zein solution was clear and homogeneous, and it has been found that zein solutions obtained in this manner may be stored for months at room temperature or higher without setting to a gel. The same solution if not heated could be expected to set to a gel in 2 weeks or less when stored under the same conditions. Furthermore, the low concentration of aldehyde required by our method, coupled with the reaction which it undergoes with zein while being heated in the sealed container results in a stabilized zein solution having only a small amount of the objectionable aldehyde odor.

A similar but still more stable dispersion may be obtained if a larger amount of formaldehyde solution is used. Also, zein solutions which are relatively stable against gelation may be obtained by this process in the absence of an aldehyde, and it is also possible to add the aldehyde after recovery of the zein solution from the sealed container.

*Example 2.*—A mixture of 300 parts of crude corn gluten, 760 parts of aqueous 80 percent ethyl alcohol and 49 parts of 37 percent formaldehyde solution was placed in a sealed container and heated with agitation at 120° C. for 15 minutes; after which the mixture was cooled and filtered through diatomaceous earth. The filtrate contained 13.5 parts of zein in 100 parts of solvent, and was found to produce clear, smooth, water-resistant films when applied to paper, glass, and other surfaces. The filtrate was also found to resist gelation for many months when stored at room temperature.

A portion of the filtrate was thoroughly mixed with an equal volume of hexane to remove part of the coloring matter from the dispersion and to concentrate the protein into a heavy liquid phase, which, when redispersed by the addition of a small amount of strong alcohol, was found to be stable toward gelation for a long period at room temperature. Analysis of this concentrate showed it to contain 20 parts of zein in 100 parts of solvent.

The dried gluten contained 7.56 percent nitrogen before extraction, and 4.53 percent nitrogen after extraction, thus indicating that our extraction process had removed approximately 56 percent of the total protein from the crude gluten.

The prolamines may be combined with the polymeric fat acids by any suitable means, for example, by solution in a common solvent such as strong aqueous alcohols or glycol monoesters, or by milling the components on a rubber mill.

Our invention is applicable to any prolamine or to substances comprising prolamines, for example, corn gluten. Polymeric fat acids of various origin may be used as, for instance, polymeric fat acids derived from corn oil, soybean oil, or any other fatty or oily material containing polymerizable fat acids or their derivatives.

Our invention is illustrated by the following description of some of its embodiments.

*Example 3.*—In a solution of 20 parts of zein in 80 parts of 90 percent ethyl alcohol, 16 to 20 parts of polymeric fat acids are added. This solution yields a clear, flexible, transparent, water-repellent material which slowly turns white in water, and which regains its original flexibility even after prolonged immersion in water. The solution can, for instance, be applied on paper as a coating by means of a doctor blade or cast as a film on a polished glass or metal surface from which it can be stripped after evaporation of the solvent. In the latter instance it may be desirable, in some cases, to add a small amount of some higher boiling zein solvent, such as ethylene glycol monobutyl ether, to control the rate of evaporation.

*Example 4.*—Results similar to those in Example 3 are obtained by adding 18 parts of polymeric fat acids to a solution of 20 parts of zein in 100 parts of "Methyl Cellosolve" (ethylene glycol monomethyl ether).

An analogous solution in which the polymeric fat acid is replaced by 18 parts of "Carbowax 1500" (polyethylene glycols) yields a material which blushes much more rapidly in water and which becomes very brittle on drying after immersion in water for a few minutes.

*Example 5.*—To a solution of 20 parts of zein in 80 parts of 95 percent ethyl alcohol, there is added 16 to 20 parts of polymeric fat acids and 5 to 10 parts of a prolamine modifying agent such as aqueous 40 percent formaldehyde solution. This solution is heated in a boiling water bath for 5 to 20 minutes. The properties of the material obtained from this solution are enhanced if, after partial or complete evaporation of the solvent, it is heated in an oven or with infrared lamps to a temperature of 100° C. or higher. A material obtained in this manner is clear, flexible, transparent and water-resistant, and exhibits only a slight blush after long immersion in water. It becomes clear again and regains its original flexibility on removal from water.

*Example 6.*—The same composition as in Example 5 is used, but the solution is autoclaved at 120° C. for 15 minutes instead of heating in a water bath. The material formed on evaporation of the solvent from this solution is heated at a temperature of 120° to 130° C. for 10 to 30 minutes. The material thus obtained is clear, flexible, transparent and water-resistant. It will not blush after long immersion in water and shows no loss in weight as a result of such immersion.

*Example 7.*—To a solution of 20 parts of zein in 100 parts of "Methyl Cellosolve," there is added 18 parts of polymeric fat acids and 5 parts of 40 percent formaldehyde solution. This solution is heated to about 120° C. (slightly below the boiling temperature of the solvent) and allowed to cool. The material obtained by evaporation of the solvent from the solution is heated until substantially free of solvent at about 120° to 130° C. This heat treatment yields a material which does not blush in water. On prolonged exposure to water it absorbs about 10 to 12 percent water (as compared to 50 to 75 percent water absorbed by similar materials not subjected to the heat treatment) without, however, blushing or losing its transparency, and without loss of plasticizer, as indicated by its flexibility on subsequent drying.

*Example 8.*—A mixture of 100 parts of zein, 90 parts of polymeric fat acids and 20 to 40 parts of "Methyl Cellosolve" is milled on a rubber mill, the rolls being heated to a temperature of about 120° C. (slightly below the boiling temperature of the solvent). To this plastic mass 10 parts of hexamethylenetetramine or trioxymethylene is added and milling is continued until thorough mixture is effected. The solvent is then evaporated by raising the temperature slightly and the resulting plastic material is calendered onto cloth. The treated cloth is then heated at 130° C. until dry. There results a cloth impregnated with a water-insoluble, blush-proof material which is impervious to mustard gas (dichlorodiethyl sulfide).

*Example 9.*—The results obtained in Example 8 are also obtained when 90 percent ethyl or isopropyl alcohol is substituted for "Methyl Cellosolve" as the solvent used to effect compatibility on the milling rolls.

In the foregoing examples, gliadin, hordein and other prolamines or prolamine-containing materials can be used in place of zein and equivalent amounts of other aldehydes can be substituted for formaldehyde, hexamethylenetetramine and trioxymethylene. Also, instead of "Methyl Cellosolve" or ethyl or isopropyl alcohol, any solvent for prolamines which is compatible with polymeric fat acids may be used.

Having thus described our invention, we claim:

1. A plastic composition comprising a principal amount of a prolamine and a plasticizing amount of a "polymeric fat acid."

2. A plastic composition comprising a principal amount of an aldehyde modified prolamine and a plasticizing amount of a "polymeric fat acid."

3. A plastic composition comprising a principal amount of zein and a plasticizing amount of a "polymeric fat acid."

4. A plastic composition comprising a principal amount of aldehyde modified zein and a plasticizing amount of a "polymeric fat acid."

5. A plastic composition comprising a principal amount of formaldehyde modified zein and a plasticizing amount of a "polymeric fat acid."

6. The process which comprises forming a solution of a prolamine in a prolamine solvent, incorporating therewith a plasticizing amount of a "polymeric fat acid," and an aldehyde in an amount sufficient to harden the prolamine, and then heating the resulting mixture at a temperature of 120° C. to 130° C. to obtain a plastic composition.

7. The process which comprises forming a solution of zein, incorporating therewith a plasticizing amount of a "polymeric fat acid," and an aldehyde in an amount sufficient to harden the zein, and then heating the resulting mixture at a temperature of 120° C. to 130° C. to obtain a plastic composition.

8. The process which comprises forming a solution of zein, incorporating therewith a plasticizing amount of a "polymeric fat acid," and formaldehyde in an amount sufficient to harden the zein, and then heating the resulting mixture at a temperature of 120° C. to 130° C. to obtain a plastic composition.

9. The process which comprises forming a solution of an aldehyde modified prolamine, incorporating therewith a plasticizing amount of a "polymeric fat acid," and then heating the resulting mixture at a temperature of 120° C. to 130° C. to obtain a plastic composition.

10. The process which comprises forming a solution of aldehyde modified zein, incorporating therewith a plasticizing amount of a "polymeric fat acid," and then heating the resulting mixture at a temperature of 120° C. to 130° C. to obtain a plastic composition.

11. The process which comprises forming a solution of formaldehyde modified zein, incorporating therewith a plasticizing amount of a "polymeric fat acid," and then heating the resulting mixture at a temperature of 120° C. to 130° C. to obtain a plastic composition.

RALPH H. MANLEY.
CYRIL D. EVANS.